May 3, 1966 K. D. ZIMMERMANN 3,248,889
PELTIER COOLING DEVICE
Filed Sept. 22, 1964
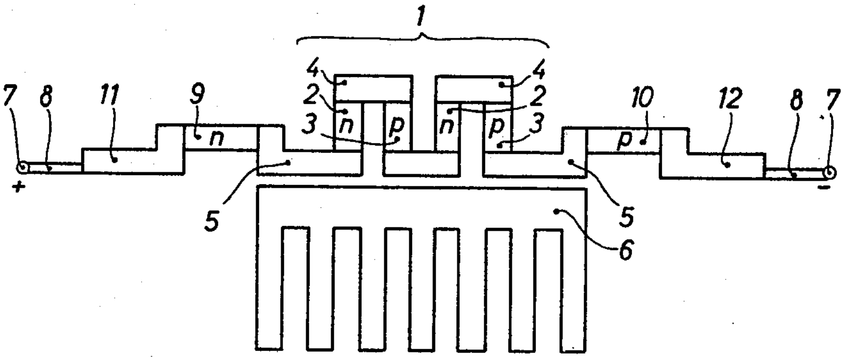
INVENTOR.
KLAUS D. ZIMMERMANN
BY
Frank R. Trifari
AGENT

United States Patent Office 3,248,889

Patented May 3, 1966

3,248,889

PELTIER COOLING DEVICE

Klaus Dieter Zimmermann, Vaals, Netherlands, assignor to North American Philips Company, Inc., New York, N.Y., a corporation of Delaware

Filed Sept. 22, 1964, Ser. No. 398,257

Claims priority, application Germany, Sept. 25, 1963, P 32,658

2 Claims. (Cl. 62—3)

This invention relates to thermo-electric cooling devices.

When the temperature of the current-supply leads in such a device lies higher than that of the first semiconductor section secured thereto, heat flows through this path into the device and must be dissipated again through the heat-exchanger. This requires either larger proportioning of the heat-exchanger or, if the heat-exchanger remains unchanged, the output of the cooling element is decreased. More particularly in a cascade arrangement in which the hot side of the second stage already lies 30° C. to 40° C. below room temperature, a considerable thermal flow through the electric conductors occurs and the lower stage of the cascade must have considerably larger dimensions to compensate for this thermal flow. The thermal flow through the supply leads may become considerably more particularly due to the large cross-sections required for the supply leads in order to avoid an interfering increase in temperature through Joule heat at the comparatively high currents (for example from 20 amps. to 40 amps.), which in turn results in the thermal flow being enhanced.

In a Peltier cooling device of the type hereinabove disclosed, these disadvantages are avoided and an unwanted thermal flow through the supply leads may be prevented if, according to the invention, at least one current-supply lead includes a Peltier element, the cold side of which is connected to the cooling device. Thus, due to thermo-electric action in the supply lead, the required temperature level is maintained so that an interfering thermal flow is prevented. More particularly if a plurality of Peltier elements in cascade connection are included in the supply lead, it is possible for the current-supply leads outside the battery to have, at any rate, over a short length a comparatively small cross section. The transfer of mechanical forces between the supply leads and the Peltier device may thus be avoided without the increase in temperature caused by the flow of current in the lead of smaller cross-section being a source of interference.

In order that the invention may be readily carried into effect, it will now be described in detail, by way of example, with reference to the accompanying diagrammatic drawing.

The Peltier device 1 comprises in a known manner a series of n-type and p-type semiconductor elements which are connected in an electrically conductive manner by means of bridges 4 and 5 respectively, the bridges 4, for example, exhibiting a temperature which is lower than that of the bridges 5, which are connected to a heat-exchanger 6. By means of a strong direct current of, say 40 amps. applied to terminals 7, the said temperature difference is obtained due to the Peltier effect and a thermal transport from the cold side 4 to the heat-exchanger 6 occurs from which the heat is dissipated by means of a cooling medium, for example, air or water.

In known arrangements in which the terminals 7 are directly connected in an electrically and thermally conductive manner to the external bridges 5, heat flows from supply leads 8 to the bridges 5, which heat then has likewise to be dissipated from the heat-exchanger 6. According to the invention, to avoid this, Peltier elements 9 (n-type conductive) and 10 (p-type conductive) are connected to the bridges 5, outer electrodes 11 and 12 of the said Peltier elements being connected to the leads 8. The Peltier elements 9 and 10 thus maintain the temperature of the bridge 5 at a value lower than that of the connecting pieces 11 and 12.

Since it is not necessary per se to transfer heat through the Peltier elements 9 and 10, that is to say since the pump output may be zero, the proportioning may be chosen for the maximum decrease in temperature. For example, for a quality figure of $z=1.8\times10^{-3}/°$ C. a temperature difference of 72° C. at $Tw=90°$ C. is obtained, that is to say that the supply leads 8 might have a temperature which is 72° C. higher than that of the heat-exchanger 6 ($T=18°$ C.). Under unvaried conditions it is also possible, in a cascade of two Peltier batteries, to connect the second stage directly to the leads which are at room temperature. If necessary the temperature difference between the device and the supply leads may be increased by connecting a plurality of Peltier elements in cascade.

What is claimed is:

1. A Peltier cooling device constituted of a series of n-type and p-type conductive elements and having a pair of current supply leads comprising at least one Peltier element n-type conductive connected between one of said current supply leads and an n-type conductive element of said cooling device, whereby the first said n-type conductive is the cold side of said Peltier element being connected to said cooling device.

2. A Peltier cooling device constituted of a series of n-type and p-type conductive elements and having a pair of current supply leads comprising a bridge connecting each current supply lead to said cooling device, a Peltier element n-type conductive connected between each of the current supply leads and an n-type conductive element of the adjacent bridge, whereby the first said n-type conductive is the cold side of each of said Peltier elements being connected to said bridge whereby the temperature of each said bridges is at a value lower than the temperature of said current supply leads.

References Cited by the Examiner

UNITED STATES PATENTS

| | | | |
|---|---|---|---|
| 1,804,072 | 5/1931 | Turrettini | 62—3 |
| 2,844,638 | 7/1958 | Lindenblad | 62—3 |
| 3,036,383 | 5/1962 | Edwards | 62—3 |
| 3,077,079 | 2/1963 | Pietsch | 62—3 |

WILLIAM J. WYE, *Primary Examiner.*